United States Patent
Braddick

(10) Patent No.: US 10,337,298 B2
(45) Date of Patent: Jul. 2, 2019

(54) EXPANDABLE LINER HANGER SYSTEM AND METHOD

(71) Applicant: TIW Corporation, Houston, TX (US)

(72) Inventor: Britt O. Braddick, Houston, TX (US)

(73) Assignee: TIW Corporation, Houston, TX (US)

( * ) Notice: Subject to any disclaimer, the term of this patent is extended or adjusted under 35 U.S.C. 154(b) by 316 days.

(21) Appl. No.: 15/285,629

(22) Filed: Oct. 5, 2016

(65) Prior Publication Data

US 2018/0094509 A1 Apr. 5, 2018

(51) Int. Cl.
| B23P 11/02 | (2006.01) |
| E21B 23/01 | (2006.01) |
| E21B 33/14 | (2006.01) |
| E21B 43/10 | (2006.01) |

(52) U.S. Cl.
CPC .......... *E21B 43/108* (2013.01); *B23P 11/025* (2013.01); *E21B 23/01* (2013.01); *E21B 33/14* (2013.01); *E21B 43/103* (2013.01); *E21B 43/105* (2013.01); *E21B 43/106* (2013.01)

(58) Field of Classification Search
CPC ...... E21B 23/01; E21B 43/103; E21B 43/105; E21B 43/106; E21B 43/108; B23P 11/025
See application file for complete search history.

(56) References Cited

U.S. PATENT DOCUMENTS

| 3,948,321 | A | 4/1976 | Owen et al. | |
| 6,457,532 | B1 * | 10/2002 | Simpson | B21D 17/04 |
| | | | | 166/207 |
| 6,648,075 | B2 | 11/2003 | Badrak et al. | |
| 6,705,395 | B2 | 3/2004 | Cook et al. | |
| 7,093,656 | B2 | 8/2006 | Maguire | |
| 7,225,880 | B2 * | 6/2007 | Braddick | E21B 43/103 |
| | | | | 166/208 |
| 7,278,838 | B2 | 10/2007 | Hodson | |
| 7,516,790 | B2 * | 4/2009 | Cook | E21B 43/103 |
| | | | | 166/207 |
| 2001/0020532 | A1 | 9/2001 | Baugh et al. | |
| 2002/0166668 | A1 * | 11/2002 | Metcalfe | B21D 17/04 |
| | | | | 166/378 |

(Continued)

OTHER PUBLICATIONS

Material data sheets for AISI 4140 and 4340 Alloy steel, published by Azo Materials on www.azom.com, accessed Oct. 12, 2018.*

(Continued)

*Primary Examiner* — Blake E Michener
(74) *Attorney, Agent, or Firm* — Baker Botts L.L.P.

(57) ABSTRACT

A liner hanger seals with casing string 8 having mill scale and supports a liner 98 within a well. The liner hanger includes a tubular anchor 48 and a tubular expander 40. The tubular anchor 48 may be positioned in the casing string 8 using an inner mandrel 10. An actuator assembly 6 forcibly moves the tubular expander 40 into the tubular anchor 48, expanding the tubular anchor 48 to grippingly engage the expanded tubular anchor 48 against the casing string 8 and to form a circumferential seal between metal sealing elements 52 on the tubular anchor 48 and the interior wall of the casing string 8. The metal sealing element 52 is oversized to provide rigidity, heat shrunk onto the tubular anchor 48, and abrasively dressed to remove excess material prior to installation of the liner hanger.

18 Claims, 5 Drawing Sheets

(56) References Cited

U.S. PATENT DOCUMENTS

| | | | |
|---|---|---|---|
| 2003/0062171 A1 | 4/2003 | Maguire et al. | |
| 2003/0102127 A1* | 6/2003 | Braddick | E21B 23/04 166/277 |
| 2004/0016544 A1* | 1/2004 | Braddick | E21B 23/04 166/277 |
| 2004/0090068 A1* | 5/2004 | Evans | E21B 17/042 285/382 |
| 2004/0194972 A1* | 10/2004 | Braddick | E21B 23/04 166/387 |
| 2005/0001429 A1* | 1/2005 | Abercrombie Simpson | E21B 43/103 285/382 |
| 2005/0057005 A1* | 3/2005 | Simpson | E21B 17/042 277/602 |
| 2005/0127671 A1* | 6/2005 | Ellington | E21B 17/02 285/382 |
| 2005/0247453 A1* | 11/2005 | Shuster | E21B 17/042 166/380 |
| 2005/0263292 A1* | 12/2005 | Braddick | E21B 43/103 166/382 |
| 2005/0263294 A1* | 12/2005 | Braddick | E21B 43/103 166/382 |
| 2006/0208488 A1* | 9/2006 | Costa | E21B 43/103 285/417 |
| 2010/0230958 A1* | 9/2010 | Holland | E21B 43/103 285/333 |
| 2012/0048536 A1* | 3/2012 | Holderman | B23P 11/025 166/228 |
| 2014/0027118 A1* | 1/2014 | DeLange | E21B 23/00 166/297 |
| 2014/0174763 A1* | 6/2014 | Zhong | E21B 43/10 166/382 |
| 2015/0101813 A1 | 4/2015 | Zhao et al. | |
| 2015/0184788 A1* | 7/2015 | Hesjevik | C23F 13/10 405/166 |
| 2015/0345249 A1* | 12/2015 | Gorrara | E21B 33/127 166/387 |
| 2016/0326830 A1* | 11/2016 | Hallundb K | E21B 33/1208 |
| 2017/0184228 A1* | 6/2017 | Kotrla | E21B 33/06 |

OTHER PUBLICATIONS

Search Report issued in corresponding Great Britain application No. GB1715490.7, dated Apr. 6, 2018, 3 pages.

* cited by examiner

EXPANDABLE LINER HANGER SYSTEM AND METHOD

BACKGROUND

Field of the Invention

The present invention relates to downhole tools and techniques for hanging a liner in a well. More specifically, the invention relates to forming an expandable liner hanger for sealably and grippingly engaging an interior of a casing string having pipe scale to support a liner in a well.

Background of Invention

Various types of liner hangers have been proposed for hanging a liner from a casing string in a well. Most liner hangers are set with slips activated by the liner hanger running tool. Liner hangers with multiple parts can pose a significant problem if one or more of the multiple parts becomes loose in the well, thereby disrupting the setting operation and making retrieval difficult. Other liner hangers and running tools cannot perform conventional cementing operations through the running tool before setting the liner hanger in the well. Still other liner hangers cannot effectively seal with the interior bore of the casing string in which the liner hangers are installed due to the presence of pipe scale. After the liner hanger is set in the casing string having pipe scale, high fluid pressure in the annulus between the liner and the casing may leak by the liner hanger, thereby defeating its intended purpose.

Liners having gripping elements and sealing elements have been expanded to support a liner within a casing string. However, the lengths of the liner hanger which was expanded were substantial, often ten feet (3.048 meters) or more, in order to provide sufficient frictional force between the liner hanger and the casing string in which the liner hanger is installed to support the weight of the liner. Prior art designs require plastic deformation of the tubular liner hanger during expansion resulting in loss of the elasticity needed for the liner hanger to maintain a fully expanded diameter. This relaxation of the gripping strength leads to a failure of both sealing integrity and load supporting capacity.

The disadvantages of the prior art are overcome by the present invention, an improved liner hanger system and method of setting the liner hanger are hereinafter disclosed.

BRIEF SUMMARY OF THE INVENTION

Embodiments of the expandable liner hanger and method of the present invention achieves positioning, suspension and improved sealing of a liner supported by a liner hanger within a casing string having mill scale on the interior bore of the casing string. Embodiments of the method include expanding a high-strength steel tubular anchor having slips and circumferential metal sealing elements into engagement with an interior bore of a casing string having a larger internal diameter than the unexpanded external diameter of the tubular hanger. The metal sealing elements are superior to elastomeric or other conventional seals because they provide effective sealing notwithstanding the presence of mill scale in the casing string.

Embodiments of the present invention use a tubular expander to expand the tubular anchor. The tubular expander remains positioned inside the expanded tubular anchor for support at its final expanded diameter, thus sandwiching the expanded and plastically deformed tubular anchor between the elastically deformed casing string and the elastically deformed tubular expander. The expanded tubular anchor and the tubular expander disposed within the tubular anchor together make up the liner hanger. Embodiments of the inventive method provides improved sealing and gripping capability, and require shorter lengths of expandable tubular liner hanger in the range of, for example, one to two feet (30.48 cm to 60.96 cm).

According to one embodiment of the present invention, a liner hanger for use in a casing string of a well is provided with one or more metal sealing elements to seal with a casing string. The liner hanger comprises a tubular anchor and a tubular expander, both removably supportable from an inner mandrel that is connectable to a work string. The work string is used to position the tubular anchor and the tubular expander at a targeted position within the casing string. The tubular anchor is expandable to an expanded diameter that is greater than the unexpanded inner diameter of the casing string. The inner mandrel includes an actuator that forces the tubular expander axially from a position substantially axially spaced from the unexpanded tubular anchor to a position substantially within the expanded tubular anchor, thereby radially expanding the tubular anchor and the one or more metal sealing elements thereon against the casing string to secure the tubular expander and the tubular anchor within the casing string. A sealing sleeve is secured to an upper end of the tubular expander for communication between the tubular expander and the liner supported from the liner hanger.

According to another embodiment, a tubular liner hanger is removably supportable on an inner mandrel for positioning the tubular liner hanger downhole, and for supporting a liner in a well. A tubular expander removably supportable from the inner mandrel has an outer diameter greater than an unexpanded inner diameter of the tubular anchor. The actuator on the inner mandrel forces the tubular expander axially from a position substantially axially spaced from the tubular anchor to a position substantially within the tubular anchor to radially expand the tubular anchor against the casing string to secure the tubular expander and the tubular anchor within the casing string. One or more dogs are provided each for engaging a slot in the liner to rotatably lock the one or more dogs to the liner. A clutch selectively engages and disengages rotation between the inner mandrel and the one or more dogs, such that the liner rotates with the inner mandrel when the clutch is engaged and the liner is rotationally disconnected from the inner mandrel when the clutch is disengaged.

A method of hanging a liner in a casing string is also provided to seal with a casing string with mill scale and to transmit fluid between the liner and a production string extending upward from the liner hanger. The method comprises positioning an expandable tubular anchor and a tubular expander on an inner mandrel, the tubular expander having an outer diameter greater than an unexpanded inner diameter of the tubular anchor, and a sealing sleeve secured to an upper end of the tubular expander. After positioning the tubular anchor at a targeted depth within a casing string, the tubular expander is forced to a position substantially within the tubular anchor to radially expand the tubular anchor against the casing string, thereby together securing the tubular anchor and the tubular expander at the targeted position within the casing string.

In one embodiment of the present invention, the tubular expander may seal with the tubular anchor along a plurality of annular scallops or bumps on an outer surface of the tubular expander. The tubular expander preferably has a generally cylindrical exterior surface along an axial length of the tubular expander, such that the tubular anchor is expanded the same amount along the axial length of engagement with the tubular expander. A stop on the tubular anchor may limit axial movement of the tubular expander with respect to the tubular anchor. One or more metal sealing elements on the tubular liner hanger are provided for sealing with the casing string upon expansion of the tubular anchor notwithstanding the presence of mill scale, and a plurality of slips on the tubular anchor are provided for securing the liner hanger (the tubular anchor with the tubular expander therein) to the casing string when the tubular anchor is expanded by the tubular expander.

In one embodiment of the present invention, a piston is axially movable in response to fluid pressure within the inner mandrel, and the clutch disengages in response to axial movement of the piston. A cementing plug or a ball within the inner mandrel increases fluid pressure to the piston.

In one embodiment of the present invention, the inner mandrel, the tubular expander and the tubular anchor together provide a bore for passing cement slurry through the liner hanger running tool prior to setting the liner hanger. The liner hanger running tool also includes a left hand thread for releasing the running tool by right hand rotation of the work string.

In a preferred embodiment, the expander setting sleeve has a uniform diameter outer surface for expanding the hanger body, with a sleeve-shaped expander setting sleeve remaining downhole to provide radial support for the expanded liner hanger.

The upper end of the expander has an upward facing sealing sleeve with an internal sealing surface suitable for receiving a tie-back seal nipple after the liner is installed in the well. The lower portion of the tubular expander may thus be positioned within the tubular anchor to expand the tubular anchor, while the upper sealing sleeve integral with the tubular expander above the shoulder may be used for sealing with a seal nipple for upward extension of the liner. Another feature of the invention is that the receptacle formed by the expander sealing sleeve and the seal nipple at the lower end of the liner string functions as a means for tying the liner back to the surface.

Another feature of the invention is that the running tool may be easily and reliably released from the set liner hanger after expansion of the liner hanger. Interference between the tubular expander and the tubular anchor secures the tubular expander within the liner hanger. The running tool may then be removed from the well.

An advantage of the invention is that the liner hanger may be constructed more economically than other prior art liner hangers. The assembly consists of few components. A related advantage is that many of the components of the assembly, such as slips and metal sealing elements, may be commercially available in accordance with various downhole conditions.

Another advantage of the invention is that the system for forming a liner hanger may utilize conventional components each with a high reliability. Existing personnel with a minimum of training may reliably use the liner hanger system according to this invention since the invention relies upon well-known surface operations to reliably form the liner hanger.

These and further features and advantages of the present invention will become apparent in the following detailed description, wherein reference is made to the figures in the accompanying drawings.

DETAILED DESCRIPTION

Figure 1A:
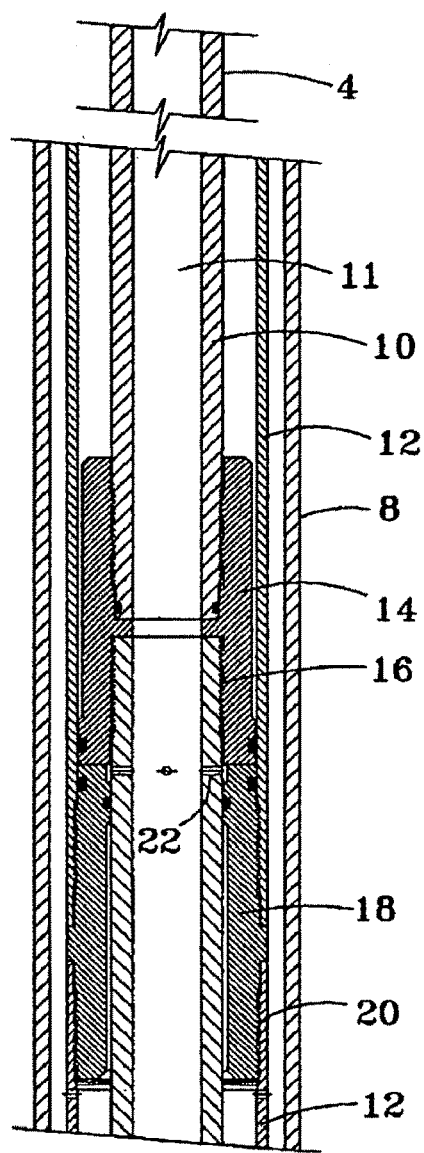
FIG. 1A depicts in cross section an upper actuator portion of the running tool.

A liner may be conveyed into the well to the targeted setting or suspension depth using a drill pipe or work string (hereinafter generally referred to as a work string) connected to a multi-stage, double-action hydraulic setting and releasing tool (running tool) that furnishes the necessary actuating force to expand a tubular anchor 48 component of the liner hanger into engagement with the casing string 8. The running tool may be constructed of sufficiently high-strength steel to support the weight of the liner 98 as it is run into and positioned within the well and to provide the necessary force needed to expand the tubular anchor 48. Additionally, the running tool has a sufficiently large internal bore in its central mandrel to enable passage and displacement of cement slurry for cementing the liner 98 within the casing string 8.

Embodiments of the liner hanger of the present invention may be installed using a setting tool that may be furnished with an interlocking releasable mechanism to prevent rotation between an inner mandrel of the running tool and the liner 98 to permit drilling of the liner 98 into the well, while allowing relative rotation between the running tool inner mandrel 10 and the liner 98 to accommodate release of the running tool from the liner hanger once the liner 98 is cemented and suspended within the casing string 8 from the liner hanger.

After an embodiment of the liner hanger and the liner are positioned at a targeted position within the casing string 8, cement slurry is pumped through the work string 4, the running tool and the liner 98 and into the annulus between the liner and the well bore and casing to cement the liner in the well in a manner well known in the art. During this operation, fluid in the annulus may flow upward past the unset liner hanger to accommodate the cement pumped into the well.

Referring to FIG. 1A, the upper end of the running tool actuator assembly 6 may include an inner connector 14 structurally connected by threads 16 to the running tool inner mandrel 10, which in turn is structurally connected to a work string 4. A throughport 22 in the mandrel 10 below the top connector allows fluid pressure within the interior of the running tool to act on both inner connector 14 and an outer connector 18, which as shown includes conventional seals 2 for sealing between the mandrel 10 and an outer sleeve 12. A predetermined amount of fluid pressure within the running tool acting on the outer connector 18 will thus provide downward movement of the outer sleeve 12, which is connected to the outer connector 18 by threads 20.

Fluid pressure to the inner connector 14 thus passes through the throughport 22, and inner connector 14 is sealed and structurally connected to the inner mandrel 10. Fluid pressure thus exerts an upward force on the inner connector 14 and thus the inner mandrel 10, and also exerts a downward force on the outer connector 18 and the outer sleeve 12.

Figure 1B:
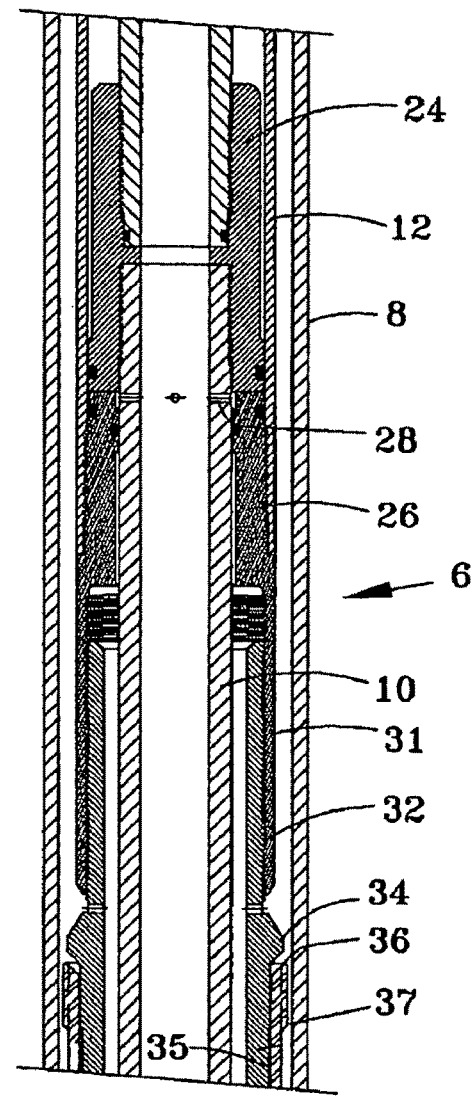
FIG. 1B depicts a lower actuator portion of the running tool and an upper portion of the sealing sleeve.

FIG. 1B shows a similar inner connector 24 and outer connector 26 acting on the inner mandrel 10 and the outer sleeve 12, respectively, with fluid entering through port 28. A series of outer connectors, inner connectors, sleeves and inner mandrels may be provided, so that forces effectively aggregate to create the desirable expansion forces. It is a particular feature of the present invention that a series of inner connectors and outer connectors may exert a force on the tubular expander in excess of 1,000,000 pounds (4,448 kN) of axial force, and preferably in excess of about 1,500,000 pounds (6,672 kN) of axial force, to expand the tubular anchor.

The inner connector (which functions as an inner annular piston), outer connector (which functions as an outer annular piston), sleeve and inner mandrel 10, which together make up the running tool, thus define a variably-sized hydraulic cavity adjacent the throughport 28. The throughport 28 passing through the inner mandrel 10 is in fluid communication with the bore 11 of the mandrel 10. The fluid pressure introduced from within the mandrel 10 through the throughport 22 and into the hydraulic cavity urges the outer connector to move downwardly with respect to the inner connector. With the inner connector fixed to the mandrel 10 and the outer connector fixed to the sleeve 12, fluid pressure introduced into the hydraulic cavity moves the sleeve 12 downward relative to the mandrel 10 to move the tubular expander 40 downward to expand the tubular anchor 48 (see FIG. 1C).

Figure 1C:
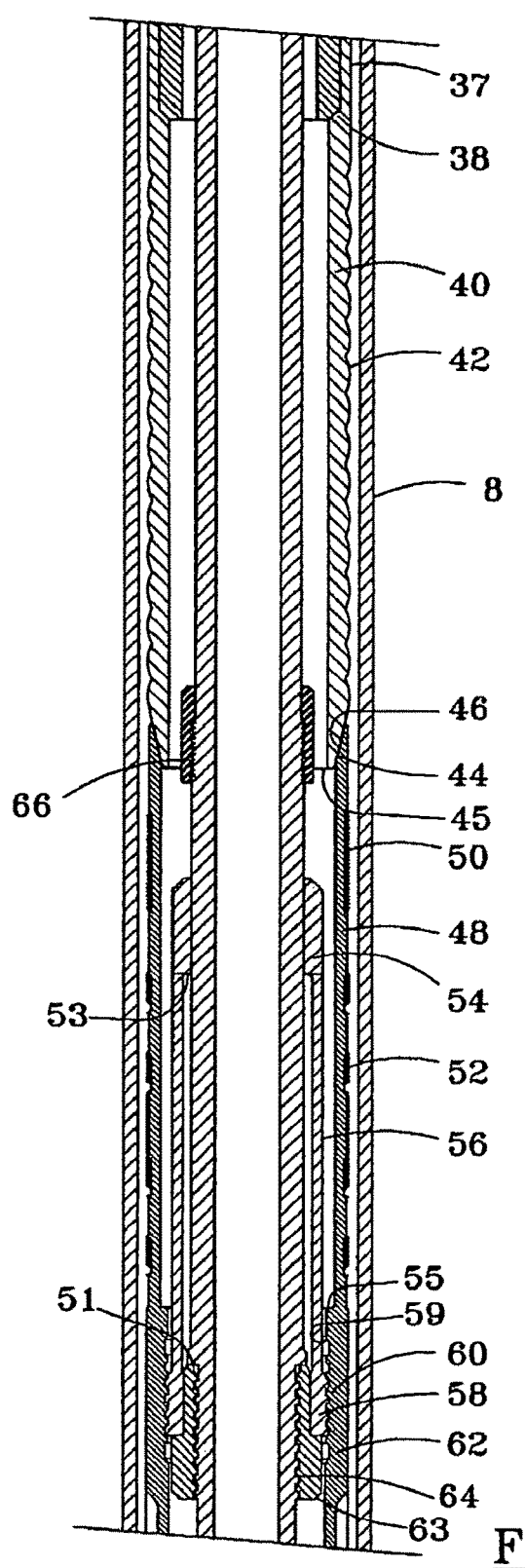
FIG. 1C depicts an expander positioned above the liner hanger.

Referring now to FIG. 1B, a force transfer member 34 may be threaded to and move with the sleeve 12, or to a lower sleeve 32 provided on a lowermost outer connector 26, so that the shoulder 34A on the force transfer member 34 approaches and may engage the top shoulder 36 on the sealing sleeve 37 at the upper end of the tubular expander 40 (see FIG. 1C). The lower shoulder 38 at the end of the force transfer sleeve engages a mating shoulder at the lower end of sealing sleeve 37 to reliably displace the tubular expander downward.

Thus, by hydraulically moving the force transfer member 34 downward, the tubular expander 40 is forcibly moved at least substantially within the liner hanger to expand the tubular anchor 48 into engagement with the casing string 8. The tubular force transfer member 34 as shown in FIG. 1B may thus be positioned above the tubular expander, and moves or strokes the tubular expander downward.

The sleeve 32 also acts as a setting sleeve which is adjustably supported on the force transfer member 34 and moves in a downward direction during the liner hanger setting operation. As shown in FIG. 1B, the force transfer member 34 may be adjusted downward within the setting sleeve 32 using adjusting thread 31 to position the radially outwardly facing taper 44 (see FIG. 1C) of the tubular expander 40 is in engagement with the radially inwardly facing taper 46 of the tubular anchor 48.

After completion of the cementing operation, a setting ball is thus dropped into the work string 4 (see FIG. 1A) and moves to engage the shear-pin supported ball seat 86 (see FIG. 1D) at the lower end of the running tool. The application of sufficient fluid pressure applied within the work string 4 and consequently through the pressure ports 22 and 28 (see FIGS. 1A and 1B, respectively) of the inner mandrel 10 and into the pressure chambers formed between the upward moving inner connectors 14 and 24 and the downward moving outer connectors 18 and 26. Pressure is increased until the force created is sufficient to cause the tubular expander 40 of FIG. 1C to move downward relative to the inner mandrel 10, forcing the radially outwardly facing taper 44 of the tubular expander 40 into and beyond the radially inwardly facing taper 46 of the tubular anchor 48. Forcing the tubular expander 40 downward causes the tubular anchor 48 to expand radially, forcing slips 50 and sealing elements 52 into engagement with the interior bore of the casing string 8, thus sealing and supporting the tubular anchor 48 within the casing string 8.

The liner hanger that is left in the casing string 8 to support a liner 98 includes a tubular anchor 48 and a tubular expander 40 positioned within the tubular anchor 48. The tubular expander 40 is supported from the inner mandrel 10 at a position aligned with and above the tubular anchor 48 when these components are run into the casing string 8. The tubular expander 40 has an outer diameter that is greater than the inner diameter of the tubular anchor 48, such that moving the tubular expander 40 into the tubular anchor 48 will expand the tubular anchor 48 against the casing string 8 to seal the expanded tubular anchor 48 with the casing string 8 and to secure the tubular expander 40 and the tubular anchor 48, and the liner 98 supported therefrom, in the casing string 8. The tubular expander 40 may be positioned above and rest on the tubular anchor 48 prior to insertion of the tubular expander 40 into the tubular anchor 48 to expand the tubular anchor 48. The tubular anchor 48 is restrained against axially downward movement as the tubular expander 40 is forced into the tubular anchor 48. The tubular anchor 48 and the tubular expander 40 are preferably solid rather than perforated or slotted, but it will be understood that embodiments of these components may vary according to structure.

As shown in FIG. 1C, downwardly movement of tubular expander 40 within the tubular anchor 48 is limited by the engagement of a shoulder 45 on the tubular expander 40 with a stop surface 55 on the tubular anchor 48. The shoulder 45 of the tubular expander 40 engages the stop surface 55 of the tubular anchor 48 at the completion of the insertion of the tubular expander 40. It will be understood that the portion of the tubular anchor 48 from the stop surface 55 to the radially inwardly facing taper 46 is expanded, while the remaining portion is not expanded. This completion of the expansion process (engaging the shoulder 45 with the stop surface 55 of the tubular anchor 48) causes a detectable spike in the hydraulic setting pressure that indicates completion of the tubular anchor 48 expansion.

In one embodiment, the tubular expander 40 includes one or more circumferential scallops 42, which may be a series of circumferential arcs or bumps 42, to form a series of circumferential metal-to-metal seals providing a bubble-tight seal between the tubular expander 40 and the interior surface of the expanded tubular anchor 48. The tubular anchor 48 is preferably a circumferentially continuous and sleeve-shaped tubular member that circumferentially engages and grips the casing string 8 and supports the liner 98 in place within the casing string 8 once expanded by relative movement of the tubular expander 40 to a position within the tubular anchor 48. The outside diameter and the inside diameter of the tubular expander 40 are substantially constant along the length of the tubular expander 40 except where an optional circumferential series of scallops 42 are provided to improve sealing and to reduce the likelihood that the tubular expander 40 will be dislodged from the reinforcing position within the expanded tubular anchor 48.

The upper end of the expander 40 has an upward facing sealing sleeve 37 with an internal sealing surface 35 suitable for receiving a tie-back seal nipple after the liner 98 is installed in the well. The lower portion of the tubular expander 40 may thus be positioned within the tubular anchor 48 to expand the tubular anchor 48, while the upper sealing sleeve 37 integral with the tubular expander 40 above the shoulder 38 may be used for sealing with a seal nipple for upward extension of the liner 98.

The tubular anchor 48 includes one or more metal sealing elements 52 specially installed about its outer circumference for engaging and sealing with the interior wall of the casing string 8 upon expansion of the tubular anchor 48. A plurality of gripping members, such as slips 50, may be provided on the tubular anchor 48 for securing the tubular anchor 48 within the casing string 8 upon expansion. The tubular anchor 48 provides an expansion receptacle for the tubular expander 40. The one or more metal sealing elements 52 are engaged with the casing string 8 upon expansion of the tubular anchor 48.

The tubular anchor 48 further includes a threaded connection 68 provided below the stop surface 55 for connecting the tubular anchor 48 to the liner 98 or to other tubular components. The inner diameter of this lower portion 65 of the tubular anchor 48 (which is not expanded) is approximately the same as the inner diameter of the liner 98. The tubular anchor 48 includes a radially inwardly facing taper 46 that provides for overlapping internal engagement of a mating radially outwardly facing taper 44 on the tubular expander 40. This allows the radially outwardly facing taper 44 of the tubular expander 40 to be at least partially inserted or seated into the radially inwardly facing taper 46 of the tubular anchor 48 prior to expansion of the tubular anchor 48. The forcibly inserted sleeve-shaped tubular expander 40 thus provides substantial radial support to the expanded tubular anchor 48 once the inner mandrel 10 is disconnected and retrieved to the surface. This increased radial support to the tubular anchor 40, along with the metal sealing elements 52, maintains fluid tight sealing engagement between the tubular anchor 48, supported from within by the tubular expander 40, and the casing string 8 in which the tubular anchor 48 is expanded. The inner mandrel 10 may then be disconnected and retrieved to the surface along with the work string 4, leaving the tubular expander 40 positioned radially inward of and axially aligned with the expanded tubular anchor 48 to maintain the tubular anchor 48 in firm gripping engagement with the casing string 8. The metal sealing elements 52 are discussed in more detail below in relation to FIGS. 6-10.

As shown on FIG. 1C, internal threads 59 in the central body portion 62 of the tubular anchor 48 are connected through the inner mandrel 10 to the work string 4 (seen in FIG. 1A) by means of external threads 60 disposed on releasable collet fingers 56. FIG. 1C shows the collet fingers 56 extending downwardly from a collet ring 54 which is supported on inner mandrel 10. In the running and setting position, the collet finger heads 58 are prevented from flexing radially inwardly by a releasing nut 63 that is connected to the inner mandrel 10 by left-hand threads 64. The inner mandrel 10 moves in an upward direction during setting of the slips 50 of the tubular anchor 48, and becomes stationary once the slips 50 are firmly deployed to grip the casing string 8.

Again as shown in FIG. 1C, the actuator assembly of the running tool may be removed by rotation of the inner mandrel 10 to unthread the left-handed threads 64 on the inner mandrel 10 from the nut 63 into which the inner mandrel 10 left-hand threads 64 are threaded. The left-handed threads 64 allow rotational release of the inner mandrel 10 while preventing undesirable unthreading of the many tubular (right-handed) connections, which typically join adjacent tubulars and other threaded components of a work string equipped with downhole tools. Once the inner mandrel 10 is unthreaded, the nut 63 is then free to move from its position (for example, by gravity) supporting the collet fingers 56 to be caught on coupling 66 (shown in FIG. 1D). The inner mandrel 10 and the inner mandrel shoulder 51 are then together raised to engage the inner mandrel shoulder 51 with the collet ring shoulder 53. It will be noted that the diameter of the inner mandrel 10 shoulder 51 is greater than the diameter of the collet ring shoulder 53 so that the inner mandrel 10 can support the collet ring 54 and the collet fingers 56 extending downwardly therefrom by engagement of the inner mandrel 10 shoulder 51 with the collet ring shoulder 53. The inner mandrel 10 can be unthreaded and raised upwardly to engage the inner mandrel shoulder 51 on the inner mandrel 10 with the collet ring shoulder 53 on the collet ring 54. Continued upwardly movement of the inner mandrel 10 and the collet ring 54 causes the collet fingers 56 extending downwardly therefrom to flexibly collapse radially inwardly moving external threads 60 on the collet fingers 56 from engagement with the internal threads 59 of the central body portion 62 of the tubular anchor 48. The inner mandrel 10 is then free to be removed from the expanded tubular anchor 48 with the tubular expander 40 lodged therein.

A seal nipple may be inserted into the upper sealing sleeve portion 37 of the tubular expander 40, until the shoulder of the seal sleeve portion 37 contacts the upper end of the sealing sleeve. The lower end of the seal nipple may also engage the shoulder 38 on the tubular expander 40 when the seal nipple is fully inserted into the expander. The sealing sleeve 37 of the tubular expander may be an upwardly extending sealing sleeve which is preferably integral with the upper end of expander 40 for sealing with the seal nipple. The sealing sleeve preferably has a polished cylindrical inner surface for sealing with a cylindrical outer surface of the seal nipple. Alternatively, the sealing sleeve could have a polished cylindrical outer surface for sealing with a cylindrical inner surface of the seal nipple. The seal nipple may also include an elastomeric seal, such as a Chevron seal stack, for sealing with the cylindrical inner surface of the sealing sleeve. A seal nipple may also be furnished with one or more external metal-to-metal ball seals for metal-to-metal sealing engagement with inner surface of sealing sleeve.

It is a feature of the invention that the sealing sleeve and the seal nipple form an expansion joint that allows for thermal expansion and contraction of the tubular string above the seal nipple. The internal diameter of the sealing nipple and the tubular above the sealing nipple may thus be substantially the same as the internal diameter of the tubular expander radially within the tubular anchor.

The method of setting a liner hanger according to this invention within a well is a considerable improvement over prior art hangers because radial expansion of the tubular anchor 48 effectively closes off the annular gap between the casing string 8 and the liner 98, providing high pressure integrity at the top of the liner 98 that is conventionally equal to the lesser of either the casing string 8 or the liner 98. Liner suspension capacity can be increased without sacrificing annular flow area by increasing the surface area of the low profile slips 50. Both the improvement in pressure integrity and suspension rating provide long term effect because of the tubular expander 40 continuously supports the tubular anchor 48.

Another feature of the expandable liner hanger is that there are no moving parts on the tubular anchor 48 or on the tubular expander 40 lodged therein that may become disengaged during installation of the liner 98 in the casing string 8. It will be understood that inadvertently disengaged components can make it difficult or impossible to get the liner 98 to the required setting depth. For that reason, the expandable tubular anchor 48 is particularly desirable for its adaptation for use in liner drilling operations. This is a technique for drilling the well by positioning a drill bit at the bottom of the liner 98 and rotating the work string 4 and liner 98 to drill the liner 98 into the well. In order to drill the liner 98 into the well, relative rotation is prohibited between the liner 98 and the inner mandrel 10 and work string 4 during the operation. However, relative rotation between the inner mandrel 10 and the liner 98 after the liner 98 is drilled into position and suspended from the casing string 8 is permitted in order to effect release of the inner mandrel 10 from the set tubular anchor 48 and the tubular expander 40 installed within the tubular anchor 48. Also, this technique may be used apart from a drilling position to rotate the liner 98 and thereby more easily insert the liner 98 into a deviated well.

Figure 2:
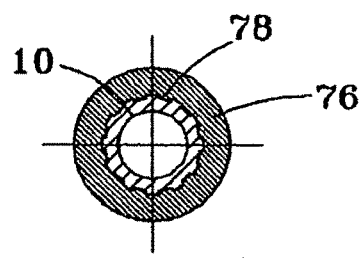
FIG. 2 is a cross section through lines 2-2 of FIG. 1D.
Figure 3:
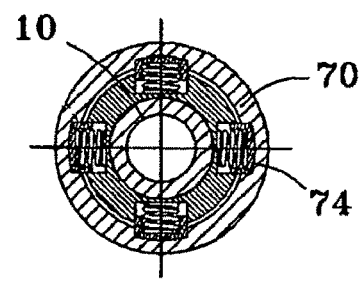
FIG. 3 is a cross section through lines 3-3 of FIG. 1D.
Figure 1D:
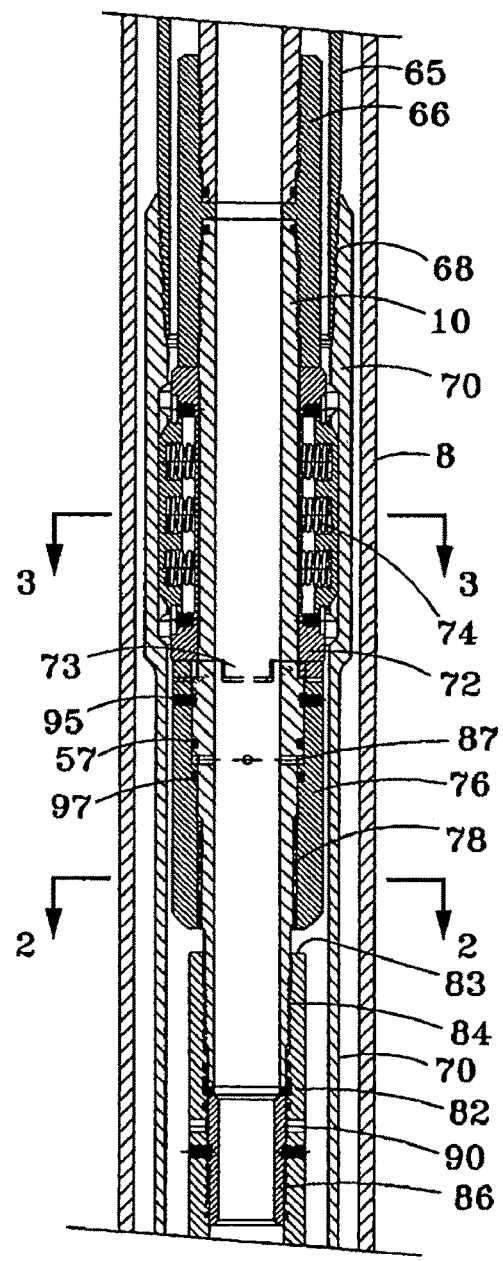
FIG. 1D depicts a mechanism for selectively rotating the liner hanger with the running tool.
Figure 1E:
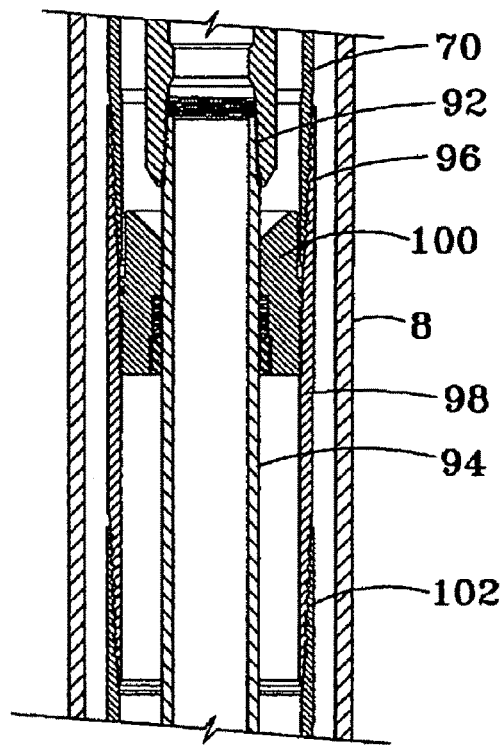
FIG. 1E depicts a lower portion of the running tool and an upper portion of a liner.

FIG. 1D and FIG. 1E shows a torque sub 70 having axial grooves is installed as a part of the liner 98 and is positioned adjacent spring biased dogs 74 that are retained in a cage 72 that is selectively rotatable about the inner mandrel 10. More particularly, torque sub 70 is coupled by threaded connection 68 with the lower portion 65 of the tubular anchor 48. The cage 72 includes lower facing clutch jaws 73 that are interlocked with mating upper facing clutch jaws located on the upper end spline bushing 76 when the running tool is in the running position. Springs 74 allow the plugs to move radially forward and pass by the smaller diameter liner hanger before enforcing the axial grooves in the torque sub 70. The spline bushing 76 has a series of internal axial splines 78 (see FIG. 2) that slidably interconnect with external axial splines on the mandrel 10. Shear pins 95 extend through the spline bushing and engage an annular groove in the mandrel 10 to releasably secure the spline sub in an axial position to maintain engagement of the lower clutch jaws 73 and upper clutch jaws. With the running tool in the above described position, relative rotation is prevented between the cage 72 and the inner mandrel 10 due to the splines 78 and the clutch jaws and relative rotation is thus prevented between the inner mandrel 10 and the liner 98 due to dogs 74, thereby permitting the liner to be drilled into the well by rotation of the drill pipe or work string 4 connected to the inner mandrel 10.

A particular feature of the present invention is that the running tool includes a sufficiently large bore to allow for the reliable passage of cement and one or more cementing plugs to pass through the bore of the running tool and cement the liner in place. More particularly, the running tool preferably has an internal diameter. Cement may thus be pumped from the surface through the work string 4 and through the inner mandrel 10, then out the lower end of the liner and into the annulus between the liner and the borehole. Once the proper amount of cement is pumped into location, the liner hanger may be set.

After the liner 98 is drilled into position, cemented and the tubular expander 40 is installed within the tubular anchor 48, release from the inner mandrel 10 is accomplished by establishing relative rotation between the liner 98 and the inner mandrel 10 after disengaging the clutch jaws 73 between the cage 72 and the spline bushing 76. This is accomplished through the use of hydraulic pressure applied through port 87 in the inner mandrel 10 into a differential pressure chamber established between mandrel seal 57 and spline bushing seal 97. Sufficient pressure is applied to create force thus necessary to break shear pins 45 and shift spline bushing 76 along inner mandrel 10 until spline bushing engages upper shoulder 83 of seat sub 82, which is connected by threads 84 to inner mandrel 10. The inner mandrel 10 is then permitted to rotate relative to the cage 72, allowing the inner mandrel 10 of the inner mandrel 10 to be rotated relative to the releasing nut 63 to disengage the inner mandrel 10 from the tubular anchor 48 and the tubular expander 40 installed therein. During retrieval of the inner mandrel 10, the dogs 74 may move radially inward as the inner mandrel 10 is retrieved upward past the set tubular anchor 48 and the tubular expander 40 therein.

FIG. 1E shows the lower portion of the running tool and an upper portion of the liner 98, which is connected at threads 96 to the lower sleeve of the sub 70. Various lengths of the liner 98 may be threaded together, as shown at 102. The lower end of seat sub 82 is threaded at 92 to a polished nipple 94, which connects to cement displacement plugs (not shown) of the well. Bushing 100 is provided for sealing between the polished nipple 94 and the liner 98.

Figure 4:
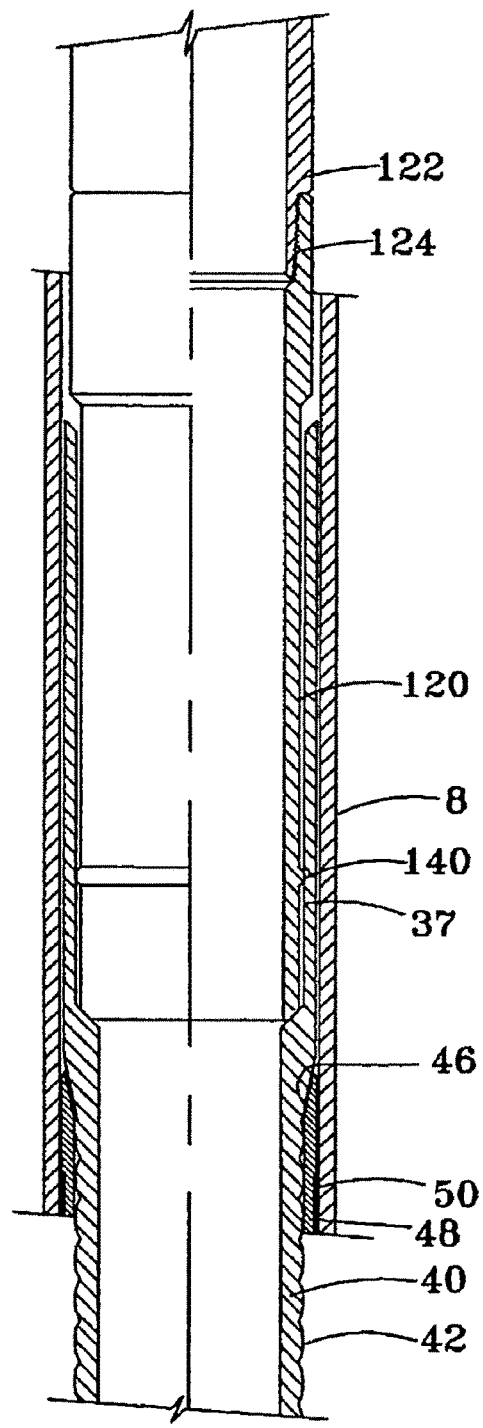
FIG. 4 depicts a set liner hanger and an upper portion of a tie back string extending upward from the set liner hanger.

FIG. 4 depicts a portion of the set tubular anchor 48 with the tubular expander 40 forcibly displaced to a position therein and the sealing sleeve 37 integral with the tubular expander 40 and extending upward from the tubular expander 40. A sealing nipple 120 is shown positioned within the sealing sleeve and is sealed thereto in a conventional manner, optionally by an annular metal-to-metal ball seal 140. An upper liner extension 122 with a large bore interior diameter substantially equal to that of the sealing sleeve and the tubular expander is shown connected to the sealing nipple 120 at threads 124.

As stated earlier, embodiments of the apparatus of the present invention include one or more metal sealing elements 52 circumferentially disposed about the tubular anchor 48. This feature adapts the tubular anchor 48 for sealing engagement with the casing string 8 notwithstanding the presence of mill scale, which is primarily iron oxides. Mill scale may be 0.1 mm (0.0039 inches) in thickness and exhibits extreme hardness. Elastomeric sealing elements often weep or leak due to the incompatibility of elastomeric sealing materials with mill scale and is not acceptable for 50-year life cycle requirements.

Figure 5:
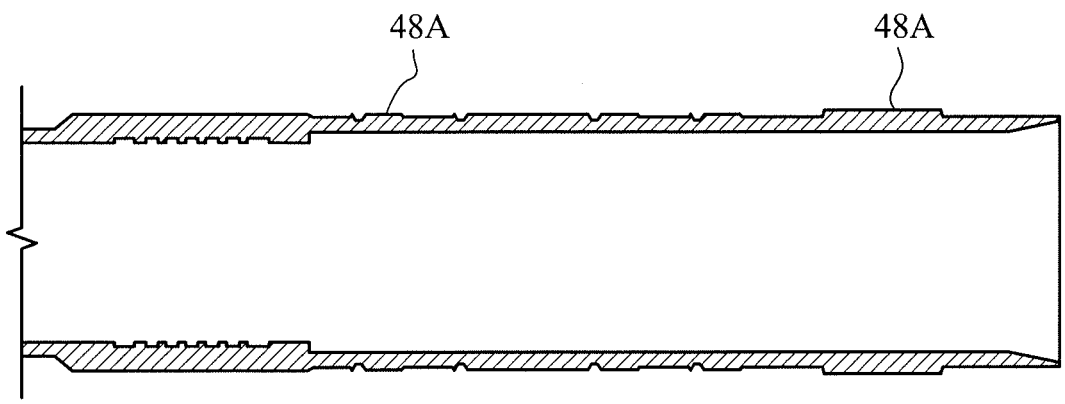
FIG. 5 is an enlarged and isolated sectional view of the portion of the tubular anchor that later receives the metal sealing elements (not shown).

FIG. 5 is an enlarged and isolated sectional view of the portion of the tubular anchor 48 that receives the metal sealing elements 52 (not shown in FIG. 5). The tubular anchor 48 includes a plurality of tapered slip recesses 48A adapted to receive a slip 50 (not shown in FIG. 5—see FIG. 1C) that grips the casing string 8 upon expansion of the tubular anchor 48. The metal sealing elements 52 can be installed on the tubular anchor 48 prior to the installation of the slips 50 into the plurality of slip recesses 48A.

Figure 6:
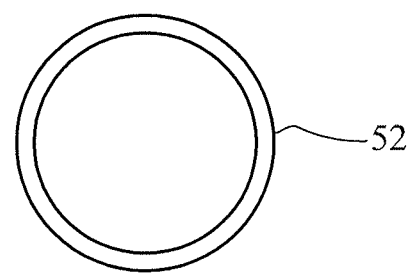
FIG. 6 is an elevation view of a metal sealing element.

FIG. 6 is an elevation view of a metal sealing element 52. The careful selection of the material from which the metal sealing element 52 enables the liner hanger of the present invention to achieve a bubble-tight seal with the casing string 8 upon expansion.

The steel from which the casing string 8 is made generally exhibits a yield strength of between 80,000 pounds per square inch and 120,000 pounds per square inch. The metal sealing element 52 comprises a metal such as, for example, steel, having a yield strength of between about 50,000 pounds per square inch and about 70,000 per square inch. It will be understood that the material from which the metal sealing element 52 is made must be relatively soft as compared to the mill scale on the interior of the casing string 8 which generally exhibits a material hardness of 80 Rockwell C compared to that of 121 Brinell for the metal sealing element 52. The disparate hardness between the metal sealing element 52 and mill scale on the casing string 8 causes the metal sealing element 52 to deform in a favorable mode upon forceful engagement with the mill scale on the casing string 8 and to seal with the casing string 8 along the flats and edges of the mill scale pieces that may be trapped intermediate the metal sealing element 52 and the casing string 8.

Figure 7:
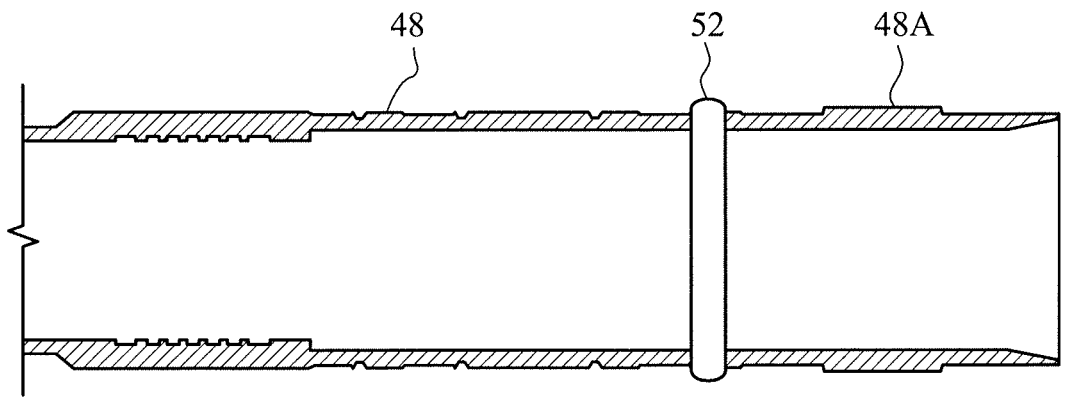
FIG. 7 is a sectional view of the portion of the metal sealing element of FIG. 6 after the tubular anchor of FIG. 5 is received through the metal sealing element.

FIG. 7 is a sectional view of the portion of the metal sealing element 22 of FIG. 6 after the tubular anchor 48 of FIG. 5 is received through the heated and expanded metal sealing element 52. It will be understood that the expanded metal sealing element 52 will contract to grip the tubular anchor 48 as a result of thermal conduction of heat from the metal sealing element 52 to the tubular anchor 48. The tubular anchor 48 is now ready for being dressed for proper sizing and then the tubular anchor 48 can be positioned in the casing string 8 (not shown) and expanded by the tubular expander 40 (not shown) to seal with the casing string 8.

Figure 8:
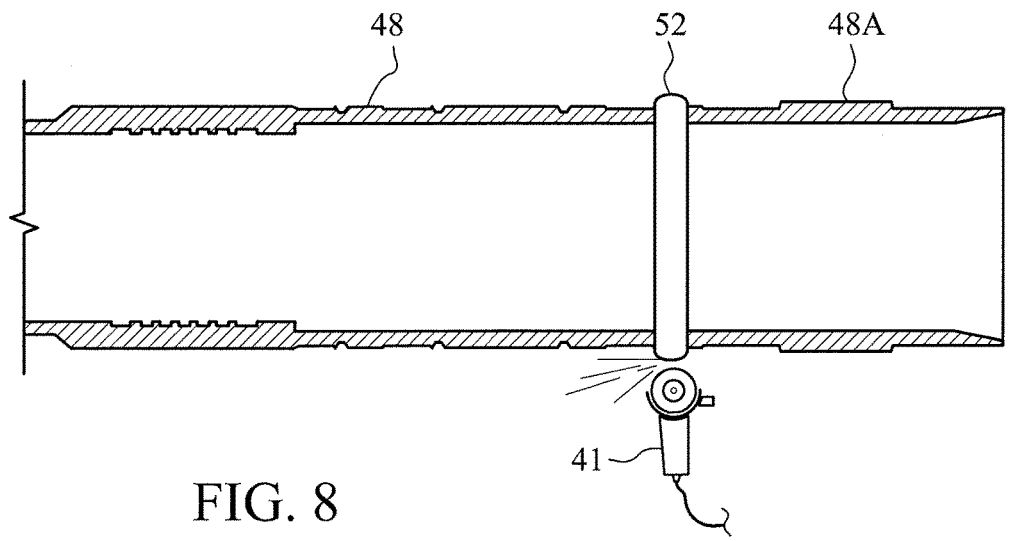
FIG. 8 is the sectional view of the metal sealing element and the portion of the tubular anchor of FIG. 7 received therein.

FIG. 8 is the sectional view of the metal sealing element 52 and the portion of the tubular anchor 48 of FIG. 7 received therein. The metal sealing element 52 is illustrated as being abrasively machined or dressed using a tool 41 such as, for example, an abrasive grinder or other machine tool, to remove excess material and to size the metal sealing element 52 for being run into the casing string 8 (not shown) and expanded, along with the portion of the tubular anchor 48, to engage and seal with the casing string 8 to provide a sealed liner hanger. It will be understood that the metal sealing element 52 is originally sized with a thickness so that it can be reliably installed onto the tubular anchor 48 without being deformed or broken. After it is heat shrunk onto the tubular anchor 48, the metal sealing element 52 remains supported and reinforced by the tubular anchor 48 so that it does not unfavorably deform during the machining or dressing process.

Figure 9:
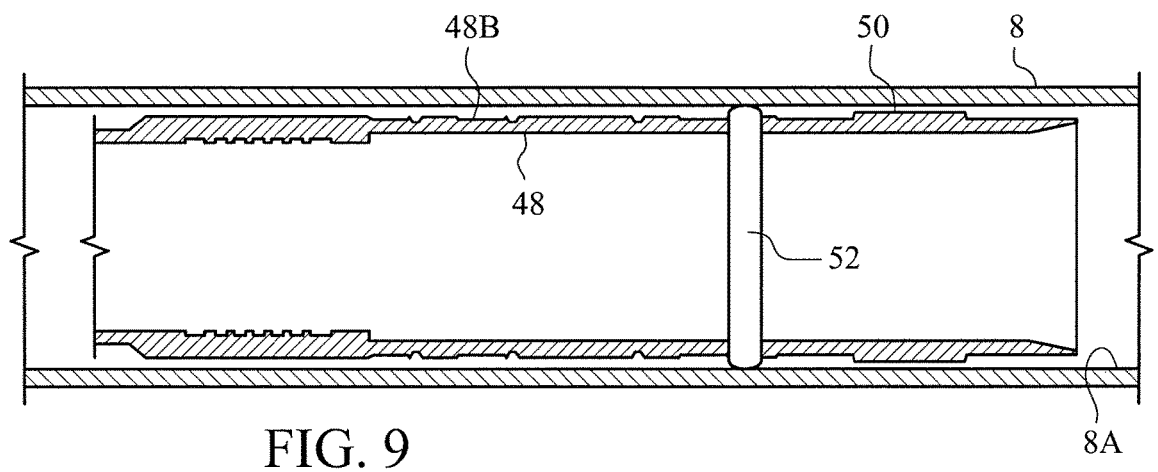
FIG. 9 is a sectional view of the metal sealing element received on the portion of the tubular anchor from FIG. 8 after being dressed with the grinder and positioned within a casing string.

FIG. 9 is a sectional view of the metal sealing element 52 received on the portion of the tubular anchor 48 from FIG. 8 after being dressed using, for example, a tool 41 and positioned within a casing string 8. The other components of the liner hanger, described above in connection with FIGS. 1, 1B, 1C, 1D, 1E, 2, 3 and 4, are omitted from FIG. 9 to better depict the engagement and interaction between the interior wall 8A of the casing string 8 (with mill scale—not shown) and the metal sealing element 52 and slips 50 disposed on the exterior wall 48B of the portion of the tubular anchor 48.

Figure 10:
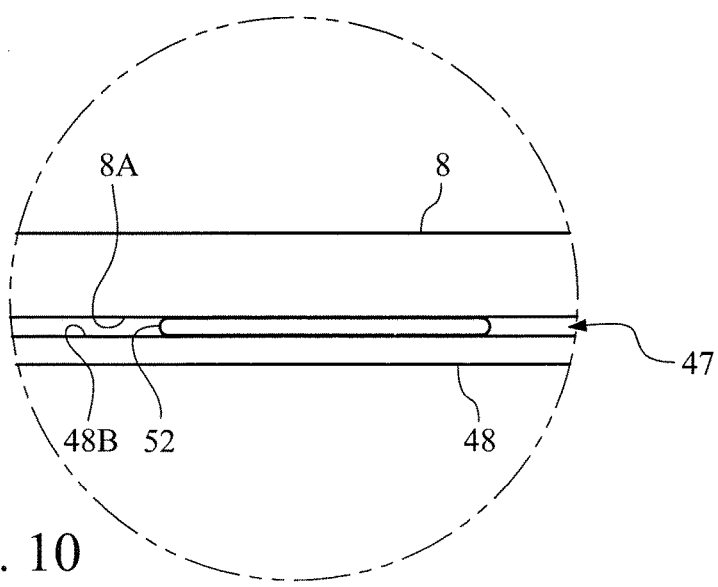
FIG. 10 is an enlarged view of a portion of the casing string, the tubular anchor and the metal sealing element of FIG. 9 after the tubular anchor and the metal sealing element are expanded into engagement with the interior wall of the casing string as described above.

FIG. 10 is an enlarged view of a portion of the casing string 8, the tubular anchor 48 and the metal sealing element 52 of FIG. 9 after the tubular anchor 48 and the metal sealing element 52 are expanded into engagement with the interior wall 8A of the casing string 8 as described above. The metal sealing element 52 is shown as having been deformed by application of force by the exterior wall 48B of the expanded tubular anchor 48 to press the metal sealing element 52 into the interior wall 8A of the casing string 8.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed.

Many modifications and variations will be apparent to those of ordinary skill in the art without departing from the scope and spirit of the invention. The specific embodiments described herein were chosen and described in order to best explain the principles of the invention and the practical application, and to enable others of ordinary skill in the art to understand the invention for various embodiments with various modifications as are suited to the particular use contemplated. Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A liner hanger for use downhole in a wellbore to support a liner and to seal an annulus between the liner and a casing string in which the liner hanger is installed, the liner hanger comprising:
   an inner mandrel having a bore and a proximal connector for connecting to a work string;
   an expandable tubular anchor releasably supportable from the inner mandrel for positioning the tubular anchor within the casing string, the tubular anchor having a radially inwardly tapered proximal end, an interior diameter and an exterior diameter that is less than an inner diameter of the casing string;
a tubular expander releasably supportable from the inner mandrel, the tubular expander having a radially outwardly tapered distal end positioned proximal to the radially inwardly tapered proximal end of the tubular anchor and an outer diameter that is greater than the interior diameter of the tubular anchor;
an actuator for forcing the tubular expander along an axis axially from a first position with the distal end of the tubular expander proximal to the proximal end of the tubular anchor to a second position substantially within the tubular anchor to radially expand the tubular anchor against the interior wall of the casing string and to radially support the expanded tubular anchor in an expanded condition; and
one or more expandable metal sealing elements interference fit onto an exterior wall of the tubular anchor by heating the one or more metal sealing elements to expand the inner diameter of the one or more metal sealing elements and cooling the one or more heated metal sealing elements around the tubular anchor, wherein the one or more metal sealing elements sealably engage the interior wall of the casing string upon expansion of the tubular anchor and the metal sealing elements;
wherein each of the one or more metal sealing elements has a radially outward facing surface defining an outer diameter of the metal sealing element, wherein the radially outward facing surface has a rounded shape as viewed in a plane parallel to a longitudinal axis of the liner hanger.

2. The liner hanger of claim 1, wherein the tubular expander includes one or more annular scallops along the exterior of the tubular expander to provide for sealing engagement with the tubular anchor by the one or more annular scallops.

3. The liner hanger of claim 1, wherein the one or more metal sealing elements interference fit on the tubular anchor comprise a material having a yield strength in the range from 50,000 to 70,000 pounds per square inch (344,738 kPa to 482,633 kPa), and wherein this yield strength is lower than a yield strength of the casing string.

4. A liner hanger as defined in claim 1, further comprising:
one or more dogs each for engaging a slot in the liner to rotatably lock the one or more dogs to the liner; and
a clutch for selectively engaging and disengaging rotation between the inner mandrel and the one or more dogs, such that the liner rotates with the inner mandrel when the clutch is engaged and the inner mandrel is rotationally disconnected from the liner when the clutch is disengaged.

5. A liner hanger as defined in claim 1, wherein the inner mandrel includes a left hand thread for releasing the actuator by right hand rotation of the work string.

6. A liner hanger for use downhole in a wellbore to seal with a casing string and support a liner on the liner hanger, the liner hanger comprising:
a tubular liner hanger removably supportable on a running tool for positioning the tubular liner hanger downhole, the liner hanger supporting the liner in the well;
a tubular expander removably supportable on the running tool, the tubular expander having an expander outermost diameter greater than an initial hanger inner diameter;
the running tool for forcibly moving the tubular expander axially from a position substantially axially spaced from the tubular liner hanger to a position substantially within the tubular liner hanger, thereby radially expanding the tubular hanger against the casing string to secure the tubular expander and the tubular hanger downhole, wherein the running tool comprises a running tool mandrel;
one or more dogs each for engaging a slot in the liner to rotatably lock the one or more dogs to the liner;
a clutch for selectively engaging and disengaging rotation between the running tool mandrel and the one or more dogs, such that the liner rotates with the running tool mandrel when the clutch is engaged and the running tool mandrel is rotationally disconnected from the liner when the clutch is disengaged; and
at least one metal sealing element disposed circumferentially about the tubular liner hanger via an interference fit by heating the at least one metal sealing element to expand the inner diameter of the at least one metal sealing element and cooling the at least one heated metal sealing element around the tubular liner hanger;
wherein each metal sealing element has a radially outward facing surface defining an outer diameter of the metal sealing element, wherein the radially outward facing surface has a rounded shape as viewed in a plane parallel to a longitudinal axis of the tubular liner hanger.

7. The liner hanger of claim 6, further comprising: a piston axially movable in response to fluid pressure within the running tool mandrel, the clutch disengaging in response to axial movement of the piston.

8. The liner hanger of claim 7, further comprising:
a ball seat; and
a ball for passing through the running tool for displacing cement from a bore of a liner to be hung in a casing string.

9. The liner hanger as defined in claim 6, wherein the running tool mandrel has a bore for passing cement through the running tool prior to setting the liner hanger.

10. The liner hanger as defined in claim 6, wherein the running tool mandrel includes a left hand thread for releasing the running tool by right hand rotation of a work string coupled to the liner hanger.

11. The liner hanger as defined in claim 6, wherein the tubular expander is sealed to the tubular liner hanger by one or more annular scallops on an outer surface of the tubular expander.

12. The liner hanger as defined in claim 6, wherein the tubular expander has a generally cylindrical exterior surface along an axial length of the tubular expander, such that the tubular liner hanger is expanded the same amount along the axial length of the tubular expander.

13. A method of hanging a liner in a casing string of a well bore to seal with the casing string, comprising:
positioning an expandable tubular anchor and tubular expander in axial alignment on a running tool with a radially outwardly tapered distal end of the tubular expander proximal to a radially inwardly tapered proximal end of the tubular anchor, the tubular anchor having an inner diameter smaller than an outer diameter of the tubular expander and an outer diameter less than an inner diameter of the casing string;
providing one or more circumferential metal sealing elements having an inner diameter sized for being interference fit onto an exterior surface of the tubular anchor;

heating the one or more metal sealing elements to expand the inner diameter of the one or more metal sealing elements;
receiving the tubular anchor within the one or more heated metal sealing elements;
cooling the one or more heated metal sealing elements by thermally conductive engagement with the tubular anchor to secure the one or more metal sealing elements onto the tubular anchor;
using an abrasive machine to dress the one or more metal sealing elements to remove excess material;
positioning the running tool, the tubular expander and the tubular anchor at a targeted depth within the casing string;
passing cement through a work string, a running tool mandrel of the running tool, the tubular expander and the tubular anchor to cement the liner in the casing string;
activating the running tool to force the tubular expander into the tubular anchor to radially outwardly expand the tubular anchor and the one or more metal sealing elements secured thereon;
disengaging the running tool mandrel from the tubular expander and the tubular anchor; and
retrieving the running tool from the wellbore and leaving the tubular expander in a reinforcing position within the tubular anchor.

14. The method of claim 13, further comprising:
positioning the tubular expander above the tubular anchor prior to forcibly moving the tubular expander substantially within the tubular anchor.

15. The method as defined in claim 13, further comprising:
sealing the tubular expander to the tubular anchor by providing one or more circumferential scallops about an outer surface of the tubular expander.

16. The method of claim 13, further comprising:
affixing a plurality of slips on an exterior surface of the tubular anchor for securing the tubular anchor within the casing string when the tubular anchor is expanded by insertion of the tubular expander.

17. The method of claim 13, further comprising:
engaging one or more dogs each with a slot in the liner to rotatably lock the one or more dogs to the liner; and
selectively disengaging a clutch for rotation between the running tool mandrel and the one or more dogs, such that the liner rotates with the running tool mandrel when the clutch is engaged and the running tool mandrel is rotationally disconnected from the liner when the clutch is disengaged.

18. The method of claim 17, further comprising:
axially moving a piston in response to fluid pressure within the running tool mandrel to selectively disengage the clutch.

* * * * *